United States Patent
Perkins et al.

(10) Patent No.: US 11,836,974 B2
(45) Date of Patent: Dec. 5, 2023

(54) DETECTING BOXES

(71) Applicant: Boston Dynamics, Inc., Waltham, MA (US)

(72) Inventors: Alex Perkins, Arlington, MA (US); Charles DuHadway, Waltham, MA (US); Peter Anderson-Sprecher, Waltham, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 18/074,354

(22) Filed: Dec. 2, 2022

(65) Prior Publication Data
US 2023/0096840 A1 Mar. 30, 2023

Related U.S. Application Data

(63) Continuation of application No. 17/246,797, filed on May 3, 2021, now Pat. No. 11,562,552, which is a (Continued)

(51) Int. Cl.
G06V 20/10 (2022.01)
G06T 7/521 (2017.01)
G06T 7/13 (2017.01)
G06T 7/593 (2017.01)
G06N 20/00 (2019.01)
B25J 9/16 (2006.01)
G06V 10/25 (2022.01)
G06V 10/764 (2022.01)
(Continued)

(52) U.S. Cl.
CPC ............ *G06V 20/10* (2022.01); *B25J 9/1697* (2013.01); *G06N 20/00* (2019.01); *G06T 7/13* (2017.01); *G06T 7/521* (2017.01); *G06T 7/593* (2017.01); *G06V 10/25* (2022.01); *G06V 10/255* (2022.01); *G06V 10/454* (2022.01); *G06V 10/764* (2022.01); *G06V 10/806* (2022.01); *G06V 10/82* (2022.01)

(58) Field of Classification Search
None
See application file for complete search history.

(56) References Cited

U.S. PATENT DOCUMENTS 9,102,055 B1 * 8/2015 Konolige ............... B25J 9/1612
9,327,406 B1 * 5/2016 Hinterstoisser ........ B25J 9/1697
(Continued)

*Primary Examiner* — Anand P Bhatnagar
(74) *Attorney, Agent, or Firm* — PIERCE ATWOOD LLP

(57) ABSTRACT

A method for detecting boxes includes receiving a plurality of image frame pairs for an area of interest including at least one target box. Each image frame pair includes a monocular image frame and a respective depth image frame. For each image frame pair, the method includes determining corners for a rectangle associated with the at least one target box within the respective monocular image frame. Based on the determined corners, the method includes the following: performing edge detection and determining faces within the respective monocular image frame; and extracting planes corresponding to the at least one target box from the respective depth image frame. The method includes matching the determined faces to the extracted planes and generating a box estimation based on the determined corners, the performed edge detection, and the matched faces of the at least one target box.

19 Claims, 11 Drawing Sheets

Related U.S. Application Data continuation of application No. 16/358,275, filed on Mar. 19, 2019, now Pat. No. 11,023,763.

(51) Int. Cl.
| | | |
|---|---|---|
| *G06V 10/80* | (2022.01) | |
| *G06V 10/82* | (2022.01) | |
| *G06V 10/44* | (2022.01) | |
| *G06V 10/20* | (2022.01) | |

(56) References Cited

U.S. PATENT DOCUMENTS

| | | | | |
|---|---|---|---|---|
| 9,486,921 | B1* | 11/2016 | Straszheim | B25J 9/1697 |
| 9,630,320 | B1* | 4/2017 | Konolige | G01B 11/254 |
| 9,649,767 | B2* | 5/2017 | Nusser | B25J 9/1697 |
| 9,704,270 | B1* | 7/2017 | Main | G06T 15/60 |
| 9,715,232 | B1* | 7/2017 | Fischer | B66F 9/0755 |
| 9,744,669 | B2* | 8/2017 | Wicks | G06V 20/10 |
| 9,802,317 | B1* | 10/2017 | Watts | G05B 19/402 |
| 9,858,683 | B2* | 1/2018 | Liu | H04N 13/128 |
| 9,987,746 | B2* | 6/2018 | Bradski | B25J 9/1664 |
| 9,990,728 | B2* | 6/2018 | Shen | G06T 7/50 |
| 11,209,265 | B2* | 12/2021 | Konolige | G01B 11/2545 |
| 11,345,040 | B2* | 5/2022 | Oleynik | G05B 19/4183 |
| 11,383,380 | B2* | 7/2022 | Bradski | B25J 9/162 |
| 11,501,445 | B2* | 11/2022 | Diankov | B25J 9/1697 |
| 2016/0221187 | A1* | 8/2016 | Bradski | B25J 9/1664 |
| 2017/0261314 | A1* | 9/2017 | Konolige | G06T 7/593 |
| 2017/0296913 | A1* | 10/2017 | Numaguchi | G06F 3/017 |
| 2018/0243904 | A1* | 8/2018 | Bradski | B65G 47/46 |
| 2019/0368865 | A1* | 12/2019 | Corkum | B25J 9/1697 |
| 2020/0078938 | A1* | 3/2020 | Bradski | B25J 9/1697 |
| 2020/0134830 | A1* | 4/2020 | Yu | G06T 7/73 |

* cited by examiner

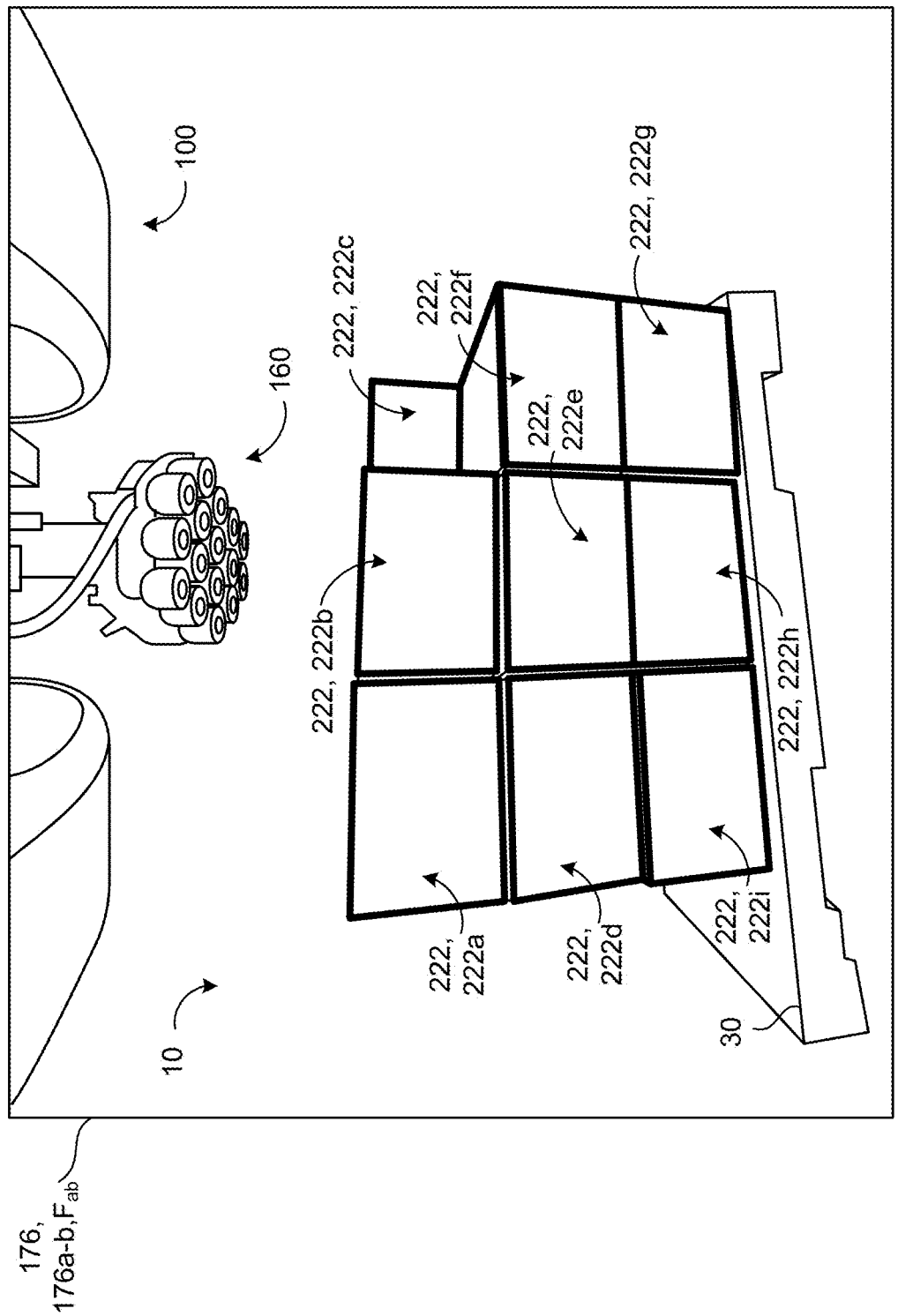

DETECTING BOXES

CROSS REFERENCE TO RELATED APPLICATIONS

This application is a continuation of, and claims priority under 35 U.S.C. § 120 from, U.S. patent application Ser. No. 17/246,797 filed on May 3, 2021 entitled "Detecting Boxes," which is a continuation of U.S. patent application Ser. No. 16/358,275, filed on Mar. 19, 2019 entitled "Detecting Boxes," each of which is incorporated herein by reference in its entirety.

TECHNICAL FIELD

This disclosure relates to detecting boxes.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to recognize shapes and/or objects in an environment about the robot may enhance a robot's functionality and provide additional benefits to these industries.

SUMMARY

One aspect of the disclosure provides a method for detecting boxes. The method includes receiving, at data processing hardware, a plurality of image frame pairs for an area of interest over a period of time where the area of interest includes at least one target box and each image frame pair of the plurality of image frame pairs is associated with a respective time stamp during the period of time and includes a monocular image frame and a respective depth image frame. For each image frame pair, the method also includes determining, by the data processing hardware, corners for a rectangle corresponding to the at least one target box within the respective monocular image frame. Based on the determined corners for the rectangle within the respective monocular image frame, the method additionally includes the following: performing, by the data processing hardware, edge detection on the at least one target box within the respective monocular image frame; determining, by the data processing hardware, faces of the at least one target box within the respective monocular image frame; and extracting, by the data processing hardware, planes from the respective depth image frame where the planes extracted from the respective depth image frame correspond to the at least one target box. The method further includes matching, by the data processing hardware, the determined faces of the at least one target box within the respective monocular image frame to the planes extracted from the respective depth image frame. The method also includes generating, by the data processing hardware, a box estimation based on the determined corners, the performed edge detection, and the matched faces of the at least one target box.

Implementations of the disclosure may include one or more of the following optional features. In some examples, the method includes aggregating, by the data processing hardware, the box estimation generated for each image frame pair to determine an adjusted box estimation over the period of time for the at least one target box. Aggregating the box estimation generated for each image frame pair may include comparing a first box estimation of the at least one target box generated for a first image frame pair to a second box estimation of the at least one target box generated for a second image frame pair and adjusting the box estimation over the period of time based on the comparison between the first box estimation and the second box estimation.

In some implementations, the method further includes, for each frame pair, cropping, by the data processing hardware, the respective monocular image frame and the depth image frame to isolate the area of interest corresponding to the at least one target box. In some examples, the method also includes, for each frame pair, correcting, by the data processing hardware, angular distortion associated with the respective monocular image frame. In some configurations, the method includes, displaying, by the data processing hardware, the box estimation as a homographic projection within a vision system for a robot. In some examples, the method may include, displaying, by the data processing hardware, the box estimation as a projection within a vision system for a robot. Here, the projection represents the at least one target box with a color indicating a confidence interval for the box estimation.

In some implementations, determining the corners for the rectangle within the respective monocular image frame includes using a machine learning model to determine the corners for the rectangle within the respective monocular image frame. The machine learning model may be a trained deep learning neural network. The determined corners for the rectangle within the respective monocular image frame may be initial seeds into a gradient ascent optimizer where the gradient ascent optimizer is configured to match faces and perform edge detection. Optionally, each respective depth image frame may be obtained from a depth sensor including one or more of a stereo camera, a scanning light-detection and ranging (LIDAR) sensor, a time-of-flight sensor, or a scanning laser-detection and ranging (LADAR) sensor. The monocular image frame and the depth image frame may be captured from one or more sensors mounted on an articulated arm of a robot. In some examples, the data processing hardware resides on a mobile robot within the area of interest.

Another aspect of the disclosure provides a robot for detecting boxes. The robot includes a sensor system, data processing hardware, and memory hardware in communication with the data processing hardware. The memory hardware stores instructions that when executed on the data processing hardware cause the data processing hardware to perform operations. The operations include receiving, from the sensor system, a plurality of image frame pairs for an area of interest over a period of time where the area of interest including at least one target box and each image frame pair of the plurality of image frame pairs is associated with a respective time stamp during the period of time and includes a monocular image frame and a respective depth image frame. For each image frame pair, the operations also include determining corners for a rectangle corresponding to the at least one target box within the respective monocular image frame. Based on the determined corners for the rectangle within the respective monocular image frame, the operations additionally include the following: performing edge detection on the at least one target box within the respective monocular image frame; determining faces of the at least one target box within the respective monocular image frame; and extracting planes from the respective depth image frame where the planes extracted from the respective depth image frame correspond to the at least one target box. The operations further include matching the determined faces of the at least one target box within the respective monocular image frame to the planes extracted from the respective depth image frame. The operations also include generating a box estimation based on the determined corners, the performed edge detection, and the matched faces of the at least one target box.

Implementations of the disclosure may include one or more of the following optional features. In some examples, the operations include aggregating the box estimation generated for each image frame pair to determine an adjusted box estimation over the period of time for the at least one target box. Aggregating the box estimation generated for each image frame pair may include comparing a first box estimation of the at least one target box generated for a first image frame pair to a second box estimation of the at least one target box generated for a second image frame pair and adjusting the box estimation over the period of time based on the comparison between the first box estimation and the second box estimation.

In some implementations, the operations further include, for each frame pair, cropping the respective monocular image frame and the depth image frame to isolate the area of interest corresponding to the at least one target box. In some examples, the operations also include, for each frame pair, correcting angular distortion associated with the respective monocular image frame. In some configurations, the operations include, displaying the box estimation as a homographic projection within a vision system for a robot. In some examples, the operations may include, displaying the box estimation as a projection within a vision system for a robot. Here, the projection represents the at least one target box with a color indicating a confidence interval for the box estimation.

In some implementations, determining the corners for the rectangle within the respective monocular image frame includes using a machine learning model to determine the corners for the rectangle within the respective monocular image frame. The machine learning model may be a trained deep learning neural network. The determined corners for the rectangle within the respective monocular image frame may be initial seeds into a gradient ascent optimizer where the gradient ascent optimizer is configured to match faces and perform edge detection. Optionally, each respective depth image frame may be obtained from a depth sensor of the sensor system where the depth sensor includes one or more of a stereo camera, a scanning light-detection and ranging (LIDAR) sensor, a time-of-flight sensor, or a scanning laser-detection and ranging (LADAR) sensor. The robot may also include an articulated arm of a robot wherein at least a portion of the sensor system is mounted on the articulated arm.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2B-2F are perspective views of example images for the image processing of FIG. 2A.

Like reference symbols in the various drawings indicate like elements.

DETAILED DESCRIPTION

Logistics has evolved to package and/or to ship goods of all shapes and sizes. With this evolution, more and more packaged goods, such as boxes, move about various logistic channels. In particular, in recent decades, consumer demand for packaged goods has significantly increased due to, among other things, an increase in online shopping. Today, large shipping companies estimate shipping several millions of packages every day. As part of shipping logistics, it is often necessary to perform certain tasks related to boxes, such as counting, sorting, transporting, palletizing, etc. These tasks may be needed at both incoming and/or outgoing facilities for various businesses, warehouses, fulfillment centers, etc. Currently, the tasks related to boxes of packaged goods use countless amounts of human labor and time. Furthermore, while speed and accuracy may be critical, these tasks are often monotonous, tedious, time-consuming, and/or strenuous.

Due to the inherent nature of human fatigue and its detrimental impact on human accuracy, these tasks are generally better suited for a robot. A robot may perform box-related tasks in a repeatable and/or reliable manner without suffering from fatigue. Advantageously, some aspects of shipping logistics already involve machinery and/or machine processing. For instance, shipping environments typically include equipment such as computers, scanners, scales, conveyors, or forklifts. By using a robot to perform tasks for boxes, the robot may function to consolidate the roles of this equipment. In some cases, a robot may more easily integrate with this equipment and/or related logistic systems. Based on these and other advantages, a robot that may accurately and efficiently detect boxes within a work environment may greatly benefit the evolving field of logistics.

Figure 1A:
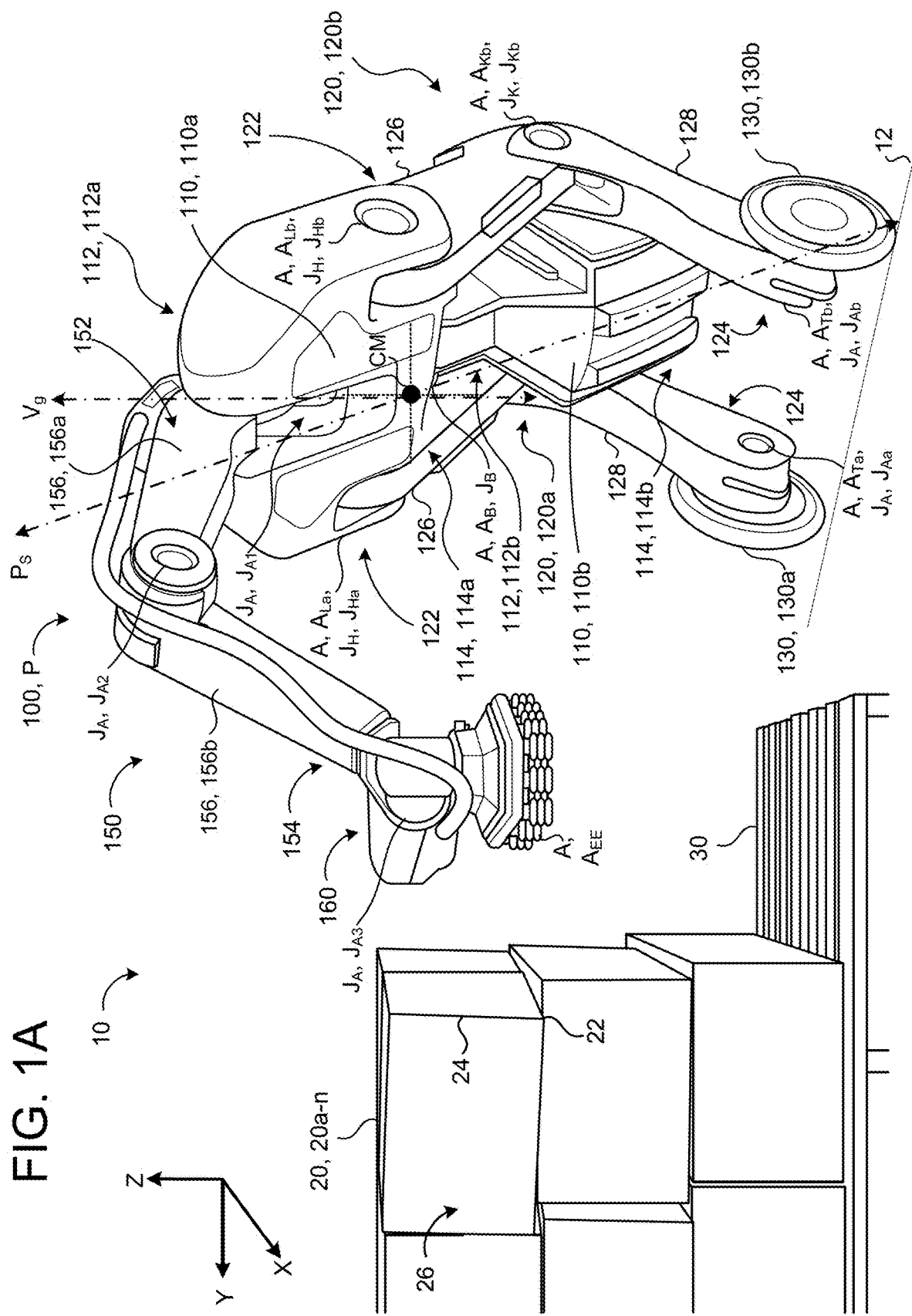
FIG. 1A is a perspective view of an example robot within a work environment.

FIG. 1A is an example of a robot 100 operating within a work environment 10 that includes at least one box 20. Here, the work environment 10 includes a plurality of boxes 20, 20a—n stacked on a pallet 30 lying on a ground surface 12. Generally, boxes 20 are used to package goods for protection, ease of transport, stackability, etc. A box 20 typically has a structure that resembles a rectangular prism or cuboid. A box 20 includes corners 22 where two edges 24 of a face 26 intersect. As a rectangular prism, a box 20 includes six faces 26 where each face 26 is a rectangle formed by a boundary of four edges 24. Each face 26 corresponds to a spatial plane where the intersection of two planes forms an edge 24. A corner 22 refers to a point or vertex where two edges 24 generally intersect at a ninety degree angle (i.e., a right angle). A box 20 has eight corners 22 (i.e., vertices) and twelve edges 24. In logistics, a box 20 often includes a stock keeping unit (SKU) (e.g., in the form of a bar code) for a good contained within the box 20. When palletized (i.e., stacked on a pallet 30), it is common for the SKU or bar code to be located on a face 26 of the box 20 that is exposed.

The work environment 10 may include, for example, a storage facility, distribution center, or fulfillment center. The robot 100 may move (e.g., drive) across the ground surface 12 to detect and/or to manipulate boxes 20 within the work environment 10. For example, the pallet 30 may correspond to a delivery truck that the robot 100 loads or unloads. The robot 100 may be associated with a shipping and/or receiving stage of logistics where the robot 100 palletizes boxes 20 or detects boxes 20 for logistics fulfillment or inventory management. For instance, the robot 100 detects a box 20 and, based on this detection, scan or process the box 20 for incoming or outgoing inventory. In some implementations, the robot 100 may manipulate one or more boxes 20 about the work environment 10.

The robot 100 has a vertical gravitational axis $V_g$ along a direction of gravity, and a center of mass CM, which is a point where the robot 100 has a zero sum distribution of mass. The robot 100 further has a pose P based on the CM relative to the vertical gravitational axis $V_g$ to define a particular attitude or stance assumed by the robot 100. The attitude of the robot 100 can be defined by an orientation or an angular position of an object in space.

The robot 100 generally includes a body 110 and one or more legs 120. The body 110 of the robot 100 may be a unitary structure or a more complex design depending on the tasks to be performed in the work environment 10. The body 110 may allow the robot 100 to balance, to sense about the work environment 10, to power the robot 100, to assist with tasks within the work environment 10, or to support other components of the robot 100. In some examples, the robot 100 includes a two-part body 110. For example, the robot 100 includes an inverted pendulum body (IPB) 110, 110a (i.e., referred to as a torso 110a of the robot 100) and a counter-balance body (CBB) 110, 110b (i.e., referred to as a tail 110b of the robot 100) disposed on the IPB 110a.

The body 110 (e.g., the IPB 110a or the CBB 110b) has first end portion 112 and a second end portion 114. For instance the IPB 110a has a first end portion 112a and a second end portion 114a while the CBB 110b has a first end portion 112b and a second end portion 114b. In some implementations, the CBB 110b is disposed on the second end portion 114a of the IPB 110a and configured to move relative to the IPB 110a. In some examples, the counter-balance body 110b includes a battery that serves to power the robot 100. A back joint $J_B$ may rotatably couple the CBB 110b to the second end portion 114a of the IPB 110a to allow the CBB 110b to rotate relative to the IPB 110a. The back joint $J_B$ may be referred to as a pitch joint. In the example shown, the back joint $J_B$ supports the CBB 110b to allow the CBB 110b to move/pitch around a lateral axis (y-axis) that extends perpendicular to the gravitational vertical axis $V_g$ and a fore-aft axis (x-axis) of the robot 100. The fore-aft axis (x-axis) may denote a present direction of travel by the robot 100. Movement by the CBB 110b relative to the IPB 110a alters the pose P of the robot 100 by moving the CM of the robot 100 relative to the vertical gravitational axis $V_g$. A rotational actuator or back joint actuator A, $A_B$ (e.g., a tail actuator or counter-balance body actuator) may be positioned at or near the back joint $J_B$ for controlling movement by the CBB 110b (e.g., tail) about the lateral axis (y-axis). The rotational actuator $A_B$ may include an electric motor, electro-hydraulic servo, piezo-electric actuator, solenoid actuator, pneumatic actuator, or other actuator technology suitable for accurately effecting movement of the CBB 110b relative to the IPB 110a.

The rotational movement by the CBB 110b relative to the IPB 110a alters the pose P of the robot 100 for balancing and maintaining the robot 100 in an upright position. For instance, similar to rotation by a flywheel in a conventional inverted pendulum flywheel, rotation by the CBB 110b relative to the gravitational vertical axis $V_g$ generates/imparts the moment $M_{CBB}$ at the back joint $J_B$ to alter the pose P of the robot 100. By moving the CBB 110b relative to the IPB 110a to alter the pose P of the robot 100, the CM of the robot 100 moves relative to the gravitational vertical axis Vg to balance and maintain the robot 100 in the upright position in scenarios when the robot 100 is moving and/or carrying a load. However, by contrast to the flywheel portion in the conventional inverted pendulum flywheel that has a mass centered at the moment point, the CBB 110b includes a corresponding mass that is offset from moment imparted at the back joint $J_B$ some configurations, a gyroscope disposed at the back joint $J_B$ could be used in lieu of the CBB 110b to spin and impart the moment (rotational force) for balancing and maintaining the robot 100 in the upright position.

The CBB 110b may rotate (e.g., pitch) about the back joint $J_B$ in both the clockwise and counter-clockwise directions (e.g., about the y-axis in the "pitch direction") to create an oscillating (e.g., wagging) movement. Movement by the CBB 110b relative to IPB 110a between positions causes the CM of the robot 100 to shift (e.g., lower toward the ground surface 12 or higher away from the ground surface 12). The CBB 110b may oscillate between movements to create the wagging movement. The rotational velocity of the CBB 110b when moving relative to the IPB 110a may be constant or changing (accelerating or decelerating) depending upon how quickly the pose P of the robot 100 needs to be altered for dynamically balancing the robot 100.

The legs 120 are locomotion-based structures (e.g., legs and/or wheels) that are configured to move the robot 100 about the work environment 10. The robot 100 may have any number of legs 120 (e.g., a quadruped with four legs, a biped with two legs, a hexapod with six legs, an arachnid-like robot with eight legs, etc.). Here, for simplicity, the robot 100 is generally shown and described with two legs 120, 120a—b.

As a two-legged robot 100, the robot includes a first leg 120, 120a and a second leg 120, 120b. In some examples, each leg 120 includes a first end 122 and a second end 124. The second end 124 corresponds to an end of the leg 120 that contacts or is adjacent to a member of the robot 100 contacting a surface (e.g., a ground surface) such that the robot 100 may traverse the work environment 10. For example, the second end 124 corresponds to a foot of the robot 100 that moves according to a gait pattern. In some implementations, the robot 100 moves according to rolling motion such that the robot 100 includes a drive wheel 130. The drive wheel 130 may be in addition to or instead of a foot-like member of the robot 100. For example, the robot 100 is capable of moving according to ambulatory motion and/or rolling motion. Here, the robot 100 depicted in FIG. 1A illustrates the first end 122 coupled to the body 110 (e.g., at the IPB 110a) while the second end 124 is coupled to the drive wheel 130. By coupling the drive wheel 130 to the second end 124 of the leg 120, the drive wheel 130 may rotate about an axis of the coupling to move the robot 100 about the work environment 10.

Hip joints $J_H$ on each side of body 110 (e.g., a first hip joint $J_H$, $J_{Ha}$ and a second hip joint $J_H$, $J_{Hb}$ symmetrical about a sagittal plane $P_S$ of the robot 100) may rotatably couple the first end 122 of a leg 120 to the second end portion 114 of the body 110 to allow at least a portion of the leg 120 to move/pitch around the lateral axis (y-axis) relative to the body 110. For instance, the first end 122 of the leg 120 (e.g., of the first leg 120a or the second leg 120b) couples to the second end portion 114a of the IPB 110a at the hip joint $J_H$ to allow at least a portion of the leg 120 to move/pitch around the lateral axis (y-axis) relative to the IPB 110a.

A leg actuator A, $A_L$ may be associated with each hip joint $J_H$ (e.g., a first leg actuator $A_L$, $A_{La}$ and a second leg actuator $A_L$, $A_{Lb}$). The leg actuator $A_L$ associated with the hip joint $J_H$ may cause an upper portion 126 of the leg 120 (e.g., the first leg 120a or the second leg 120b) to move/pitch around the lateral axis (y-axis) relative to the body 110 (e.g., the IPB 110a). In some configurations, each leg 120 includes the corresponding upper portion 126 and a corresponding lower portion 128. The upper portion 126 may extend from the hip joint $J_H$ at the first end 122 to a corresponding knee joint $J_K$ and the lower portion 128 may extend from the knee joint $J_K$ to the second end 124. A knee actuator A, $A_K$ associated with the knee joint $J_K$ may cause the lower portion 128 of the leg 120 to move/pitch about the lateral axis (y-axis) relative to the upper portion 126 of the leg 120.

Each leg 120 may include a corresponding ankle joint $J_A$ configured to rotatably couple the drive wheel 130 to the second end 124 of the leg 120. For example, the first leg 120a includes a first ankle joint $J_A$, $J_{Aa}$ and the second leg 120b includes a second ankle joint $J_A$, $J_{Ab}$. Here, the ankle joint $J_A$ may be associated with a wheel axle coupled for common rotation with the drive wheel 130 and extending substantially parallel to the lateral axis (y-axis). The drive wheel 130 may include a corresponding torque actuator (drive motor) A, $A_T$ configured to apply a corresponding axle torque for rotating the drive wheel 130 about the ankle joint $J_A$ to move the drive wheel 130 across the ground surface 12 (which may be interchangeably referred to as a work surface 12) along the fore-aft axis (x-axis). For instance, the axle torque may cause the drive wheel 130 to rotate in a first direction for moving the robot 100 in a forward direction along the fore-aft axis (x-axis) and/or cause the drive wheel 130 to rotate in an opposite second direction for moving the robot 100 in a rearward direction along the fore-aft axis (x-axis).

In some implementations, the legs 120 are prismatically coupled to the body 110 (e.g., the IPB 110a) such that a length of each leg 120 may expand and retract via a corresponding actuator (e.g., leg actuators $A_L$) proximate the hip joint $J_H$, a pair of pulleys (not shown) disposed proximate the hip joint $J_H$ and the knee joint $J_K$, and a timing belt (not shown) synchronizing rotation of the pulleys. Each leg actuators $A_L$ may include a linear actuator or a rotational actuator. Here, a control system 140 with a controller 142 (e.g., shown in FIG. 1B) may actuate the actuator associated with each leg 120 to rotate the corresponding upper portion 126 relative to the body 110 (e.g., the IPB 110a) in one of a clockwise direction or a counter-clockwise direction to prismatically extend/expand the length of the leg 120 by causing the corresponding lower portion 128 to rotate about the corresponding knee joint $J_K$ relative to the upper portion 126 in the other one of the clockwise direction or the counter-clockwise direction. Optionally, instead of a two-link leg, the at least one leg 120 may include a single link that prismatically extends/retracts linearly such that the second end 124 of the leg 120 prismatically moves away/toward the body 110 (e.g., the IPB 110a) along a linear rail. In other configurations, the knee joint $J_K$ may employ a corresponding a rotational actuator as the knee actuator $A_K$ for rotating the lower portion 128 relative to the upper portion 126 in lieu of the pair of synchronized pulleys.

The corresponding axle torques applied to each of the drive wheels 130 (e.g., a first drive wheel 130, 130a associated with the first leg 120a and a second drive wheel 130, 130b associated with the second leg 120b) may vary to maneuver the robot 100 across the ground surface 12. For instance, an axle torque applied to the first drive wheel 130a that is greater than an axle torque applied to the second drive wheel 130b may cause the robot 100 to turn to the left, while applying a greater axle torque to the second drive wheel 130b than to the first drive wheel 130 may cause the robot 100 to turn to the right. Similarly, applying substantially the same magnitude of axle torque to each of the drive wheels 130 may cause the robot 100 to move substantially straight across the ground surface 12 in either the forward or reverse directions. The magnitude of axle torque applied to each of the drive wheels 130 also controls velocity of the robot 100 along the fore-aft axis (x-axis). Optionally, the drive wheels 130 may rotate in opposite directions to allow the robot 100 to change orientation by swiveling on the ground surface 12. Thus, each axle torque may be applied to the corresponding drive wheel 130 independent of the axle torque (if any) applied to the other drive wheel 130.

In some examples, the body 110 (e.g., at the CBB 110b) also includes at least one non-drive wheel (not shown). The non-drive wheel is generally passive (e.g., a passive caster wheel) and does not contact the ground surface 12 unless the body 110 moves to a pose P where the body 110 (e.g., the CBB 110b) is supported by the ground surface 12.

In some implementations, the robot 100 further includes one or more appendages, such as an articulated arm 150 (also referred to as an arm or a manipulator arm) disposed on the body 110 (e.g., on the IPB 110a) and configured to move relative to the body 110. The articulated arm 150 may have one or more degrees of freedom (e.g., ranging from relatively fixed to capable of performing a wide array of tasks in the work environment 10). Here, the articulated arm 150 illustrated in FIG. 1A has five-degrees of freedom. While FIG. 1A shows the articulated arm 150 disposed on the first end portion 112 of the body 110 (e.g., at the IPB 110a), the articulated arm 150 may be disposed on any part of the body 110 in other configurations. For instance, the articulated arm 150 is disposed on the CBB 110b or on the second end portion 114a of the IPB 110a.

The articulated arm 150 extends between a proximal first end 152 and a distal second end 154. The arm 150 may include one or more arm joints $J_A$ between the first end 152 and the second end 154 where each arm joint $J_A$ is configured to enable the arm 150 to articulate in the work environment 10. These arm joints $J_A$ may either couple an arm member 156 of the arm 150 to the body 110 or couple two or more arm members 156 together. For example, the first end 152 connects to the body 110 (e.g., the IPB 110a) at a first articulated arm joint $J_{A1}$ (e.g., resembling a shoulder joint). In some configurations, the first articulated arm joint $J_{A1}$ is disposed between the hip joints $J_H$ (e.g., aligned along the sagittal plane $P_S$ of the robot 100 at the center of the body 110). In some examples, the first articulated arm joint $J_{A1}$ rotatably couples the proximal first end 152 of the arm 150 to the body 110 (e.g., the IPB 110a) to enable the arm 150 to rotate relative to the body 110 (e.g., the IPB 110a). For instance, the arm 150 may move/pitch about the lateral axis (y-axis) relative to the body 110.

In some implementations, such as FIG. 1, the arm 150 includes a second arm joint $J_{A2}$ (e.g., resembling an elbow joint) and a third arm joint $J_{A3}$ (e.g., resembling a wrist joint). The second arm joint $J_{A2}$ couples a first arm member 156a to a second arm member 156b such that these members 156a-b are rotatable relative to one another and also to the body 110 (e.g., the IPB 110). Depending on a length of the arm 150, the second end 154 of the arm 150 coincides with an end of an arm member 156. For instance, although the arm 150 may have any number of arm members 156, FIG. 1A depicts the arm 150 with two arm members 156a—b such that the end of the second arm member 156b coincides with the second end 154 of the arm 150. Here, at the second end 154 of the arm 150, the arm 150 includes an end effector 160 that is configured to perform tasks within the work environment 10. The end effector 160 may be disposed on the second end 154 of the arm 150 at an arm joint $J_A$ (e.g., at the third arm joint $J_{A3}$) to allow the end effector 160 to have multiple degrees of freedom during operation. The end effector 160 may include one or more end effector actuators A, $A_{EE}$ for gripping/grasping objects. For instance, the end effector 160 includes one or more suction cups as end effector actuators $A_{EE}$ to grasp or to grip objects by providing a vacuum seal between the end effector 160 and a target object, e.g., a target box 202.

The articulated arm 150 may move/pitch about the lateral axis (y-axis) relative to the body 110 (e.g., the IPB 110a). For instance, the articulated arm 150 may rotate about the lateral axis (y-axis) relative to the body 110 in the direction of gravity to lower the CM of the robot 100 while executing turning maneuvers. The CBB 120b may also simultaneously rotate about the lateral axis (y-axis) relative to the IPB 110 in the direction of gravity to assist in lowering the CM of the robot 100. Here, the articulated arm 150 and the CBB 110b may cancel out any shifting in the CM of the robot 100 in the forward or rearward direction along the fore-aft axis (x-axis), while still effectuating the CM of the robot 100 to shift downward closer to the ground surface 12.

Figure 1B:
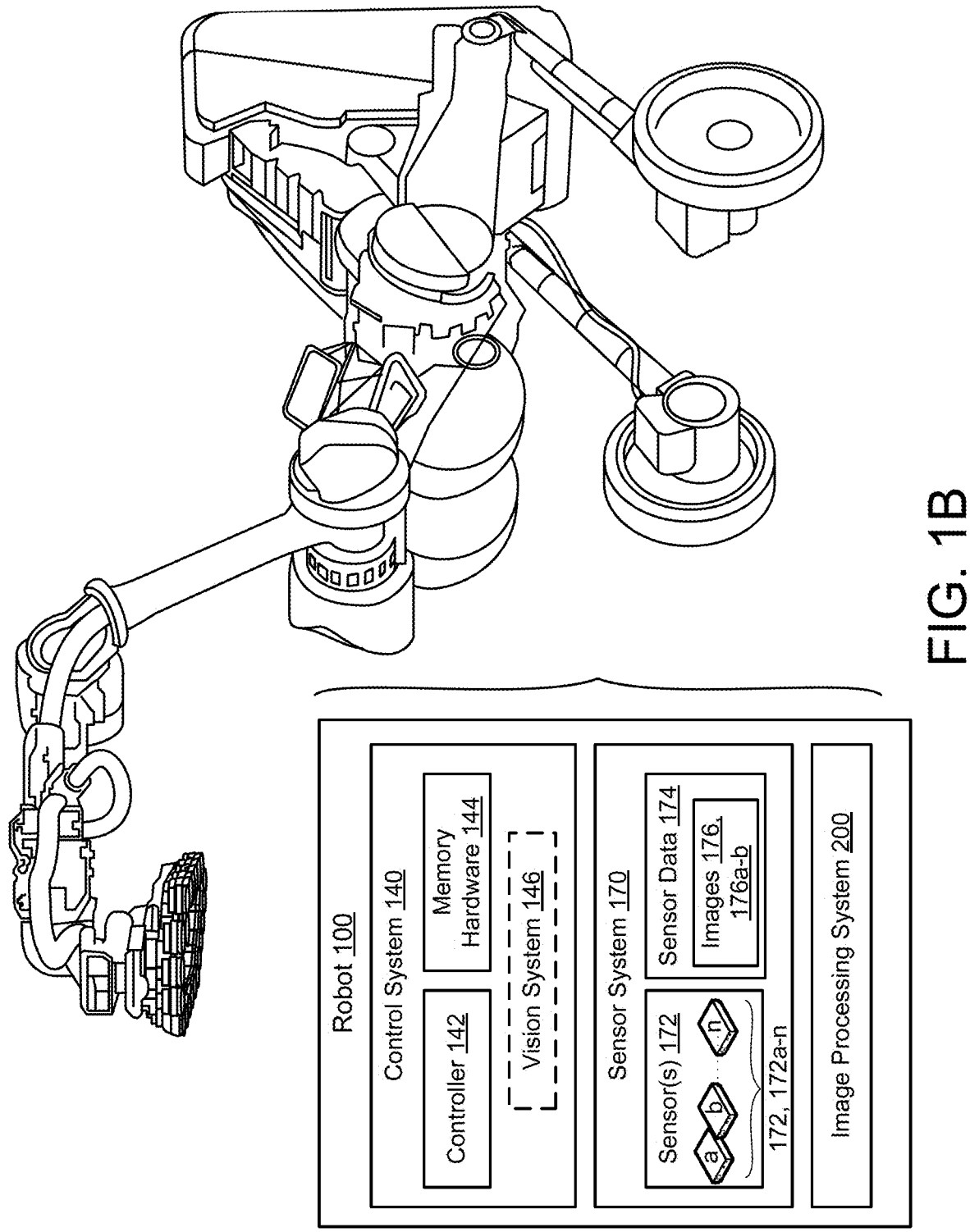
FIG. 1B is a schematic view of an example arrangement of systems of the robot of FIG. 1A.

With reference to FIG. 1B, the robot 100 includes a control system 140 configured to monitor and to control operation of the robot 100. In some implementations, the robot 100 is configured to operate autonomously and/or semi-autonomously. However, a user may also operate the robot by providing commands/directions to the robot 100. In the example shown, the control system 140 includes a controller 142 (e.g., data processing hardware) and memory hardware 144. The controller 142 may include its own memory hardware or utilize the memory hardware 144 of the control system 140. In some examples, the control system 140 (e.g., with the controller 142) is configured to communicate (e.g., command motion) with the actuators A (e.g., back actuator(s) $A_B$, leg actuator(s) $A_L$, knee actuator(s) $A_K$, drive belt actuator(s), rotational actuator(s), end effector actuator(s) $A_{EE}$, etc.) to enable the robot 100 to move about the work environment 10. The control system 140 is not limited to the components shown, and may include additional (e.g., a power source) or less components without departing from the scope of the present disclosure. The components may communicate by wireless or wired connections and may be distributed across multiple locations of the robot 100. In some configurations, the control system 140 interfaces with a remote computing device and/or a user. For instance, the control system 140 may include various components for communicating with the robot 100, such as a joystick, buttons, transmitters/receivers, wired communication ports, and/or wireless communication ports for receiving inputs from the remote computing device and/or user, and providing feedback to the remote computing device and/or user.

The controller 142 corresponds to data processing hardware that may include one or more general purpose processors, digital signal processors, and/or application specific integrated circuits (ASICs). In some implementations, the controller 142 is a purpose-built embedded device configured to perform specific operations with one or more subsystems of the robot 100. The memory hardware 144 is in communication with the controller 142 and may include one or more non-transitory computer-readable storage media such as volatile and/or non-volatile storage components. For instance, the memory hardware 144 may be associated with one or more physical devices in communication with one another and may include optical, magnetic, organic, or other types of memory or storage. The memory hardware 144 is configured to, inter alia, to store instructions (e.g., computer-readable program instructions), that when executed by the controller 142, cause the controller 142 to perform numerous operations, such as, without limitation, altering the pose P of the robot 100 for maintaining balance, maneuvering the robot 100, detecting objects, transporting objects, and/or performing other tasks within the work environment 10. The controller 142 may perform the operations based on direct or indirect interactions with a sensor system 170.

The sensor system 170 includes one or more sensors 172, 172a—n. The sensors 172 may include vision/image sensors, inertial sensors (e.g., an inertial measurement unit (IMU)), and/or kinematic sensors. Some examples of image/vision sensors 172 include a camera such as a monocular camera or a stereo camera, a time of flight (TOF) depth sensor, a scanning light-detection and ranging (LIDAR) sensor, or a scanning laser-detection and ranging (LADAR) sensor. More generically, the sensors 172 may include one or more of force sensors, torque sensors, velocity sensors, acceleration sensors, position sensors (linear and/or rotational position sensors), motion sensors, location sensors, load sensors, temperature sensors, touch sensors, depth sensors, ultrasonic range sensors, infrared sensors, and/or object sensors. In some examples, the sensor 172 has a corresponding field(s) of view defining a sensing range or region corresponding to the sensor 172. Each sensor 172 may be pivotable and/or rotatable such that the sensor 172 may, for example, change the field of view about one or more axis (e.g., an x-axis, a y-axis, or a z-axis in relation to a ground surface 12). In some implementations, the body 110 of the robot 100 includes a sensor system 170 with multiple sensors 172 about the body to gather sensor data 174 in all directions around the robot 100. Additionally or alternatively, sensors 172 of the sensor system 170 may be mounted on the arm 160 of the robot 100 (e.g., in conjunction with one or more sensors 172 mounted on the body 110). The robot 100 may include any number of sensors 172 as part of the sensor system 170 in order to generate sensor data 172 for the work environment 10 about the robot 100. For instance, when the robot 100 is maneuvering about the work environment 10, the sensor system 170 gathers pose data for the robot 100 that includes inertial measurement data (e.g., measured by an IMU). In some examples, the pose data includes kinematic data and/or orientation data about the robot 100.

When surveying a field of view with a sensor 172, the sensor system 170 generates sensor data 174 (also referred to as image data 174) corresponding to the field of view. For image/vision sensors 172, the sensors 172 may capture images 176 as sensor data 174 at a particular frequency such that the sensor data 174 includes frames F corresponding to the field of view at a time interval. In configurations where the sensor system 170 includes multiple vision sensors 172, the sensor system 170 may be configured to control a direction (e.g., field of view) of each sensor 172 such that more than one field of view corresponding to an image sensor 172 overlap to allow for different types of image data 174 to be used in image processing together. In some examples, the sensor system 170 includes at least one monocular camera as a first sensor 172, 172a and at least one depth sensor (e.g., stereo camera, LIDAR, TOF, etc.) as a second sensor 172, 172b. The sensors 172a—b may overlap their fields of view. With overlapping fields of view, the sensors 172a—b capture a monocular image 176, 176a (i.e., two-dimensional) and a depth image 176, 176b (i.e., three-dimensional) at the same instance in time for the same field of view (or nearly the same field of view depending on sensor mounting placement) of the work environment 10. This results in identical or nearly identical frames F with different sensor data 174 for each matching frame F (i.e., at the same instance in time). Each matching frame F may be associated with a respective time stamp corresponding to the instance in time. For example, a monocular camera such as the first sensor 172a captures/generates sensor data 174 for a frame F of a monocular image 176a, and a depth sensor such as the second sensor 172b captures/generates sensor data 174 for a frame F of a depth image 176b that corresponds to a three-dimensional volumetric point cloud. Each frame F of a monocular image 176a may be referred to as a "monocular image frame" and each frame F of a depth image 176b may be referred to as a "depth image frame".

Sensor data 174 gathered by the sensor system 170, such as the image data, pose data, inertial data, kinematic data, etc., relating to the robotic environment 10 may be communicated to the control system 140 (e.g., the controller 142 and/or memory hardware 144) of the robot 100. In some examples, the sensor system 170 gathers and stores the sensor data 174 (e.g., in the memory hardware 144 or memory hardware related to remote resources communicating with the robot 100). In other examples, the sensor system 170 gathers the sensor data 174 in real-time and processes the sensor data 174 without storing raw (i.e., unprocessed) sensor data 174. In yet other examples, the controller system 140 and/or remote resources store both the processed sensor data 174 and raw sensor data 174. The sensor data 174 from the sensors 172 may allow systems of the robot 100 to detect and/or to analyze conditions about the robot 100. For instance, the sensor data 174 may allow the control system 140 to maneuver the robot 100, alter a pose P of the robot 100, and/or actuate various actuators A for moving/rotating mechanical components of the robot 100.

Figure 2A:
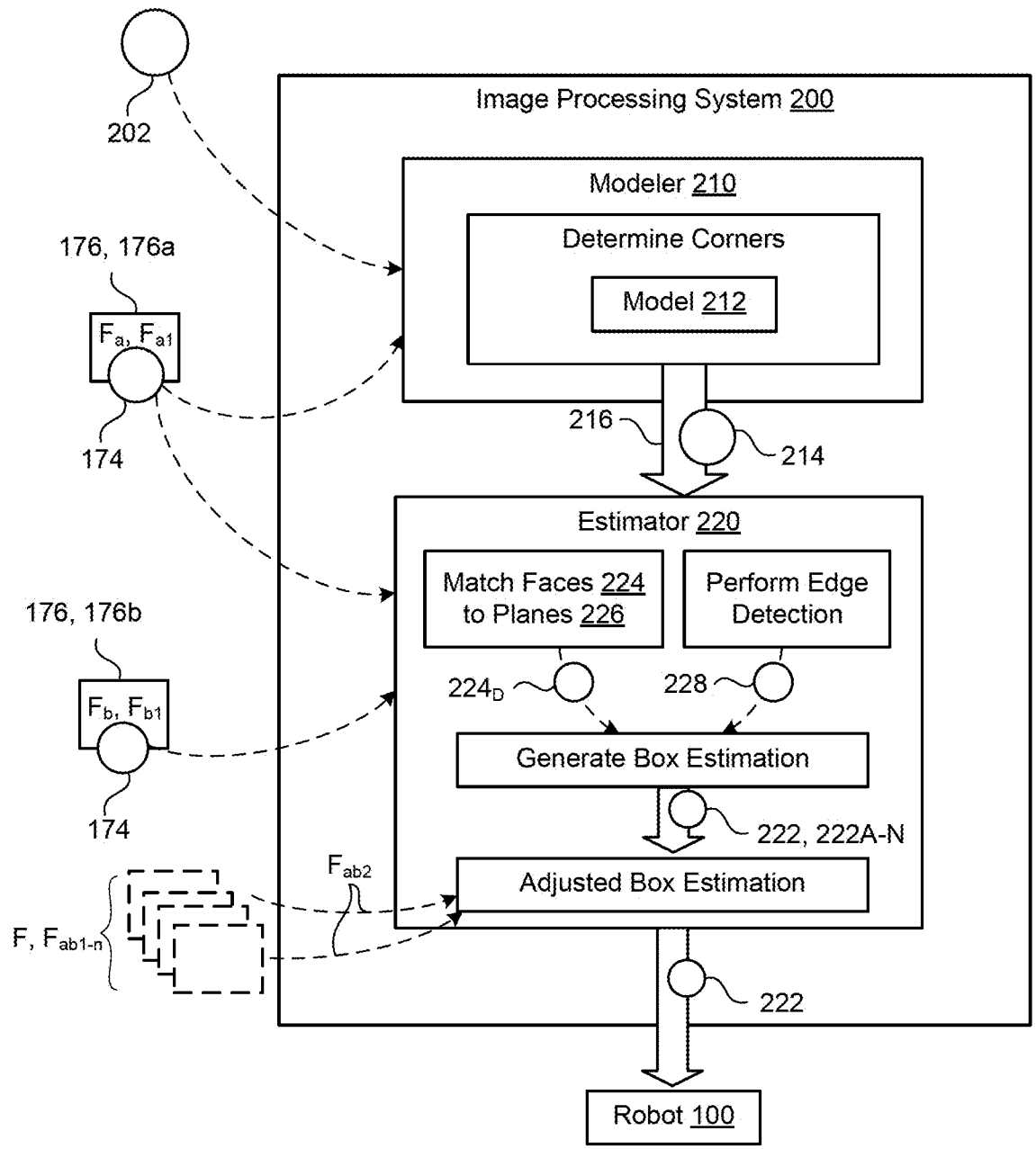
FIG. 2A is a schematic view of an example image processing system for the robot of FIG. 1A.

As shown in FIG. 2A, the robot 100 includes an image processing system 200 that is configured to process sensor data 174 corresponding to images 176 captured by sensor(s) 172 of the sensor system 170. Based on the sensor data 174, the image processing system 200 is configured to detect shapes corresponding to one or more boxes 20 within the work environment 10 about the robot 100. By detecting one or more boxes 20, the robot 100 may manipulate the boxes 20 or facilitate other processing for each target box 20. In some examples, the robot 100 detects one or more box 20 and communicates a location of the box 20 to another entity (e.g., a worker, another robot, an owner of the box 20, etc.). For example, when the robot 100 detects a box 20 (e.g., a pallet 30 of boxes 20), the robot 100 may communicate the location of the box 20 to a forklift operator. In some configurations, with the image processing system 200, the robot 100 may recognize when the robot 100 may need assistance with tasks related to the boxes 20. In other words, the robot 100 may be aware of constraints such as a strength of the robot 100 or a size of a box 20 that the robot 100 is able to manipulate.

The image processing system 200 receives sensor data 174 corresponding to a plurality of frames F of images 176 for an area of interest. When the sensor system 170 captures the frames F of images 176, the sensor system 170 aligns the field of view for one or more sensors 172 that correspond to the area of interest including one or more target boxes 202. More specifically, the image processing system 200 receives sensor data 174 corresponding to a plurality of image frame pairs 176a, 176b, $F_{ab}$ for the area of interest over a period of time, whereby each image frame pair $F_{ab}$ is associated with a respective time stamp (denoted as an image frame F) during the period of time and includes a respective monocular image frame 176a, $F_a$ and a respective depth image frame 176b, $F_b$ for the area of interest. For simplicity, FIGS. 2A-2F depict a single image frame pair $F_{ab1}$ associated with a respective time stamp. To process the frames F, the image processing system 200 generally includes a modeler 210 and an estimator 220. FIGS. 2B-2F illustrate examples of the image processing functions performed by the components of the image processing system 200 (e.g., the detector 210, the modeler 210, and the estimator 220).

In some examples, the robot 100 indicates to the image processing system 200 that the work environment 10 may include a box 20 due to sensor data 174 from the sensor system 170 (i.e., indicates a possibility of a target box 202). For instance, the sensor data 174 generally indicates (i.e., senses) an object within the area about the robot 100 (e.g., without knowing that the object may correspond to a box 20). In some implementations, the robot 100 receives an input from a remote computing device and/or user that an area of interest may have a box 20 (i.e., an input indicating a target box 202). In either case, the sensor system 170 communicates with the image processing system 200 to capture image data 174 for the area of interest. Based on an input indicating a target box 202, the image processing system 200 may be initialized to begin box detection.

In some examples, when the image processing system 200 receives the image frame pairs $F_{ab}$ (e.g., the monocular image frames 176a and the depth image frames 176b) for an area of interest, each image 176a—b includes image data 174 for objects or features in the work environment 10 other than a box 20. For instance, when the work environment 10 is a warehouse, the images 176a—b may include features such as flooring, ceiling, walls, etc. The image processing system 200 is configured to recognize these non-box features and to remove image data 174 corresponding to these non-box features. In other words, the images 176a-b may be cropped to isolate the area of interest that includes the target box 202. For example, FIG. 2C shows a monocular image frame 176a, $F_a$ after cropping out image data 174 corresponding to non-box features from the monocular image frame 176a, $F_a$ of FIG. 2B, thereby isolating the area of interest and revealing less of the work environment 10 when compared to FIG. 2B. Although the image processing system 200 is capable of processing an entirety of images 176 captured by a sensor 172, the removal of non-box features may streamline (e.g., reduce) an amount of image data 174 that needs to be processed by the image processing system 200.

In some implementations, the image processing system 200 receives an image 176 (e.g., the monocular image 176a or the depth image 176b) that is distorted. A distorted image generally refers to an image 176 that attempts to capture a subject with straight line segments (i.e., a rectilinear subject), but the captured image results in curved line segments (i.e., a non-rectilinear subject). Some examples of distortion are barrel distortion (i.e., distortion with concave lines towards a center of the image 176), pin cushion distortion (i.e., distortion with convex lines towards a center of the image 176), or angular distortion (i.e., distortion with angular lines rather than rectilinear lines). In some configurations, the distortion of the image 176 is due to the sensor 172 that captures the image 176. The sensor 172 may have some degree of tilt based on how the sensor 172 mounts on the robot 100. For instance, the sensor 172 may be mounted on a curved surface of the robot 100. When the image processing system 200 receives the image 176 with distortion, the image processing system 200 performs image correction to transform the distorted image 176 into a rectilinear projection. The corrected image may allow the image processing system 200 to more efficiently process images 176 to detect boxes 20 since boxes 20 (e.g., sides and faces of boxes) are generally formed from straight line segments.

Figure 2B:
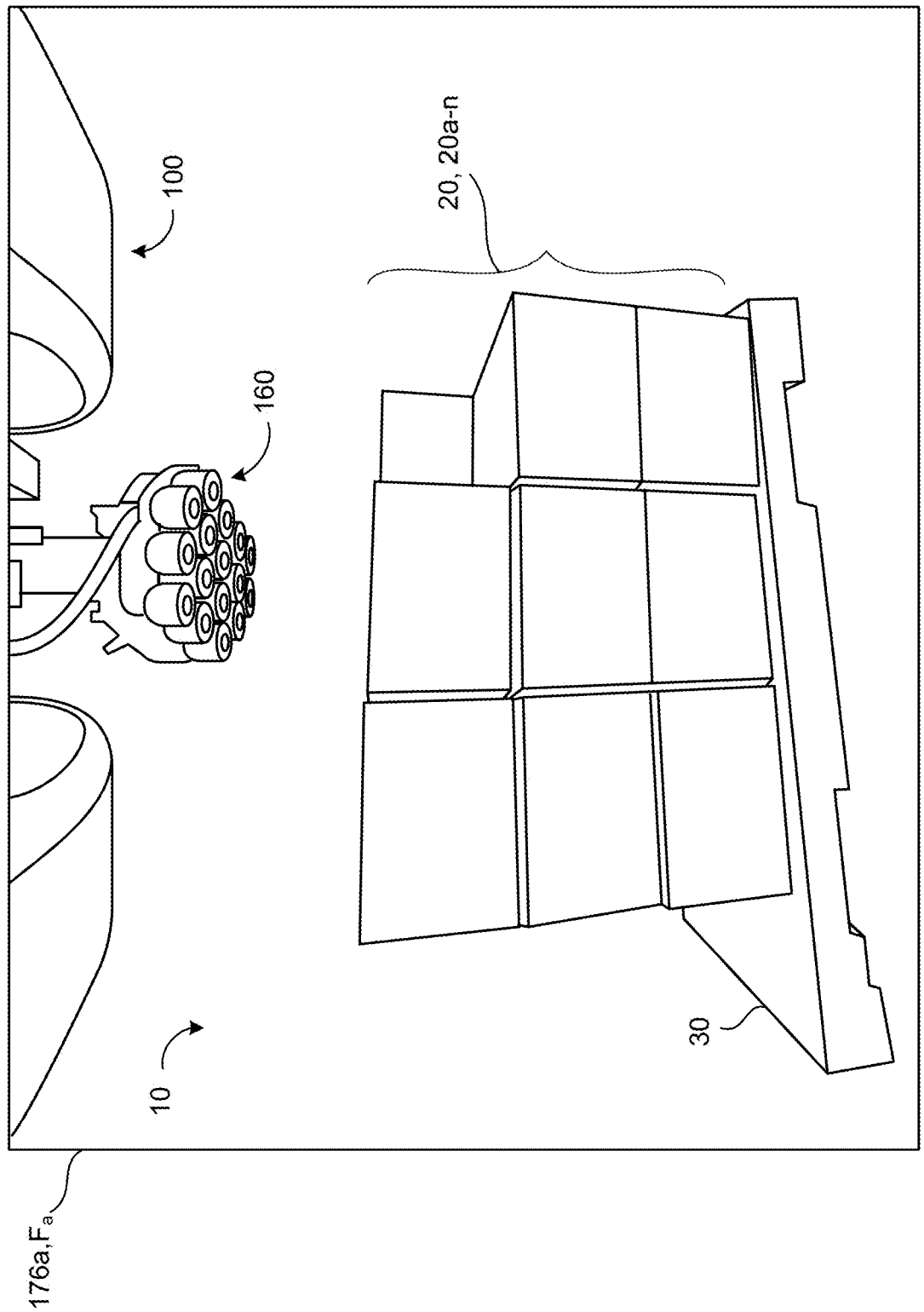
Figure 2C:
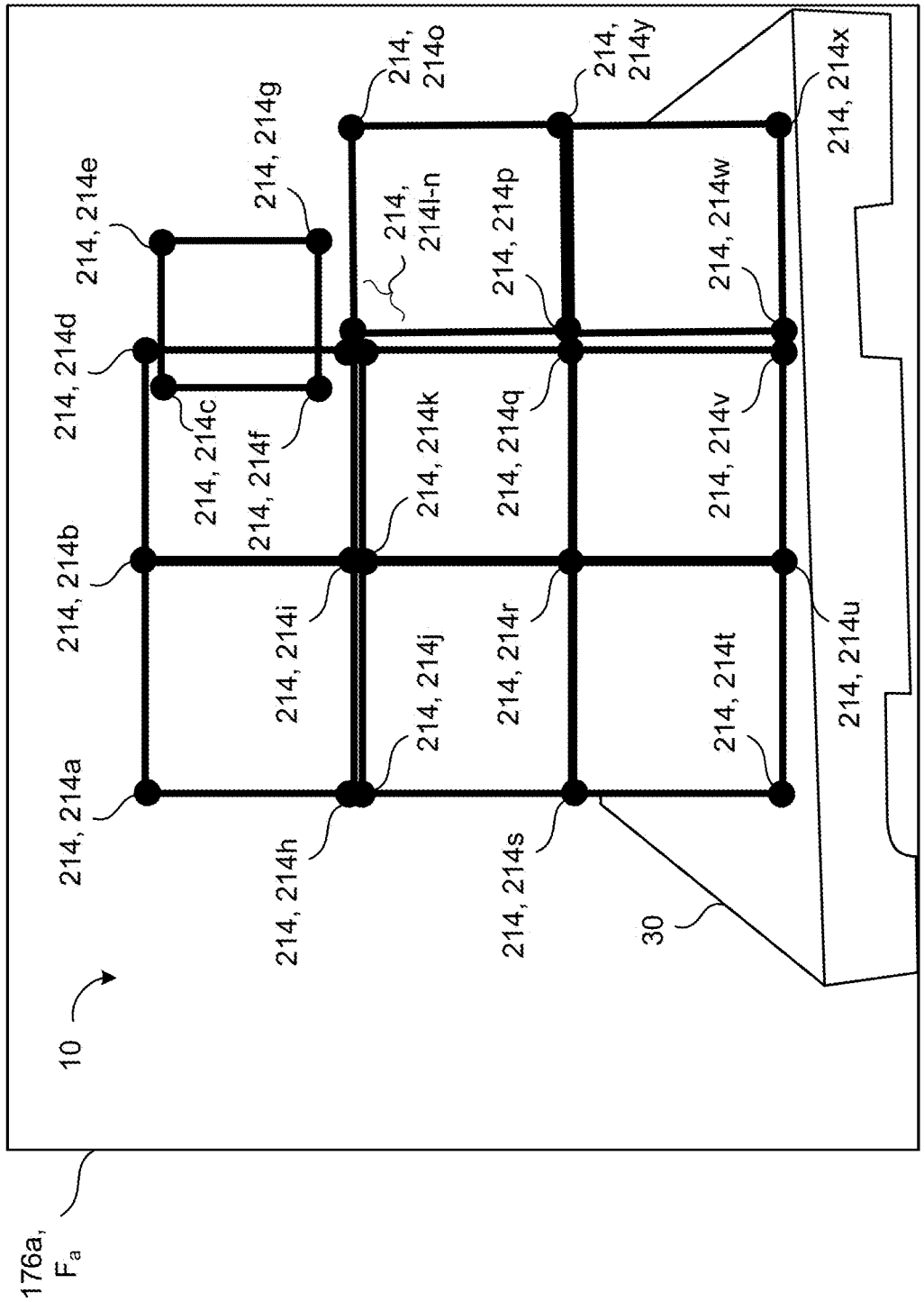

The modeler 210 is configured to receive the monocular image frames 176a, $F_a$ (e.g., image data 174 related to a monocular image 176a as shown in FIG. 2B) that include at least one target box 202. Additionally or alternatively, the modeler 210 may detect that the image data 174 for a frame $F_a$ of the monocular image 176a includes at least one box 20 as a target box 202. For each image frame pair $F_{ab}$, the modeler 210 is configured to determine corners 214 for a rectangle associated with the at least one target box 202 based on the received monocular image frames 176a, $F_a$. For simplicity, FIG. 2A shows the modeler 210 receiving one monocular image 176a associated with a respective frame $F_{a1}$. The modeler 210 includes a model 222 that determines the corners 214 (i.e., a digital representation of a corner 22 of a box 20) for the rectangle associated with the at least one target box 202 from the monocular image 176a. For instance, FIG. 2C illustrates monocular image 176a where the modeler 210 has identified twenty-five corners 214, 214a—y in the monocular image 176a. In some examples, the model 222 is a machine learning model trained on input data sets and output result sets to predict an output 216 during inference based on input data similar to the training data sets. During training, the model 222 receives training data sets that include frames F with one or more boxes 20. Here, each frame F of a training data set has labels that identify corners 214 for each training box within the frame F. Typically for training purposes, data is segregated into training data sets and evaluation data sets (e.g., 90% training and 10% evaluation) and the model 222 is trained until a performance of the model 222 on the evaluation set stops decreasing. Once the performance stops decreasing on the evaluation set, the model 222 may be ready for inference to determine corners 214 for a rectangle associated with at least one target box 202 within the monocular image 176a. In some implementations, the model 222 is a neural network such as a deep learning neural network. In some examples, the neural network is a recurrent neural network. Once trained, the model 222 receives the monocular image 176a and generates corners 214 for the target box 202 as an output 216. Here, because the monocular image 176a is two-dimensional, the output 216 from the model 222 is only two-dimensional (e.g., a two-dimensional coordinate location for the corners 214 of the target boxes 202). The modeler 210 is configured to communicate the corners 214 of the target boxes 202 to the estimator 220.

Since the robot 100 is operating in a three-dimensional work environment 10, the corners 214 from the output 216 of the modeler 210 require further processing by the image processing system 200 to translate into three-dimensional box detection. Moreover, directly translating the two-dimensional information (i.e., identified corners 214 from the modeler 210) into three-dimensional may suffer from inaccuracies. For example, the corners 214 of the target boxes 202 correspond to a single point in a two-dimensional space where image data 174 for edges 24 of a box 20 intersect. Furthermore, determining a single point accurately may prove difficult because of image 176 and/or sensor 172 quality. For instance, a corner 214 for a target box 202 may be best detected with sub-pixel quality for the image 176, but limitations, such as sensor quality or lighting within the work environment 10, result in sub-optimal corner determination by the modeler 210. Therefore, the corners 214 determined by the modeler 210 may be used in conjunction with the depth image 176b to increase the accuracy of box detection and to translate the two-dimensional corner information into three-dimensional information about one or more target boxes 202 for the robot 100.

The estimator 220 receives the output 216 that includes corners 214 for target boxes 202 within the frame $F_a$ of the monocular image 176a (i.e., the monocular image frame 176a, F). The corners 214 may be identified within the monocular image 176a or provided separately from the monocular image 176a as data (e.g., coordinate data). The estimator 220 also receives the respective depth image frame 176b, $F_b$ for the corresponding image frame pair $F_{ab}$ that includes the monocular image frame 176a, $F_a$ from which the corners 214 were determined from. Using both the respective monocular image frame 176a, $F_a$ and the respective depth image frame 176b, $F_b$ for the corresponding image frame pair $F_{ab}$, the estimator 220 may perform two stages of box detection based on the corners 214 from the modeler 210. These stages capitalize on a geometry corresponding to a box 20 to ensure that the estimator 220 generates an accurate box estimation 222 when performing box detection by the image processing system 200.

Figure 2D:
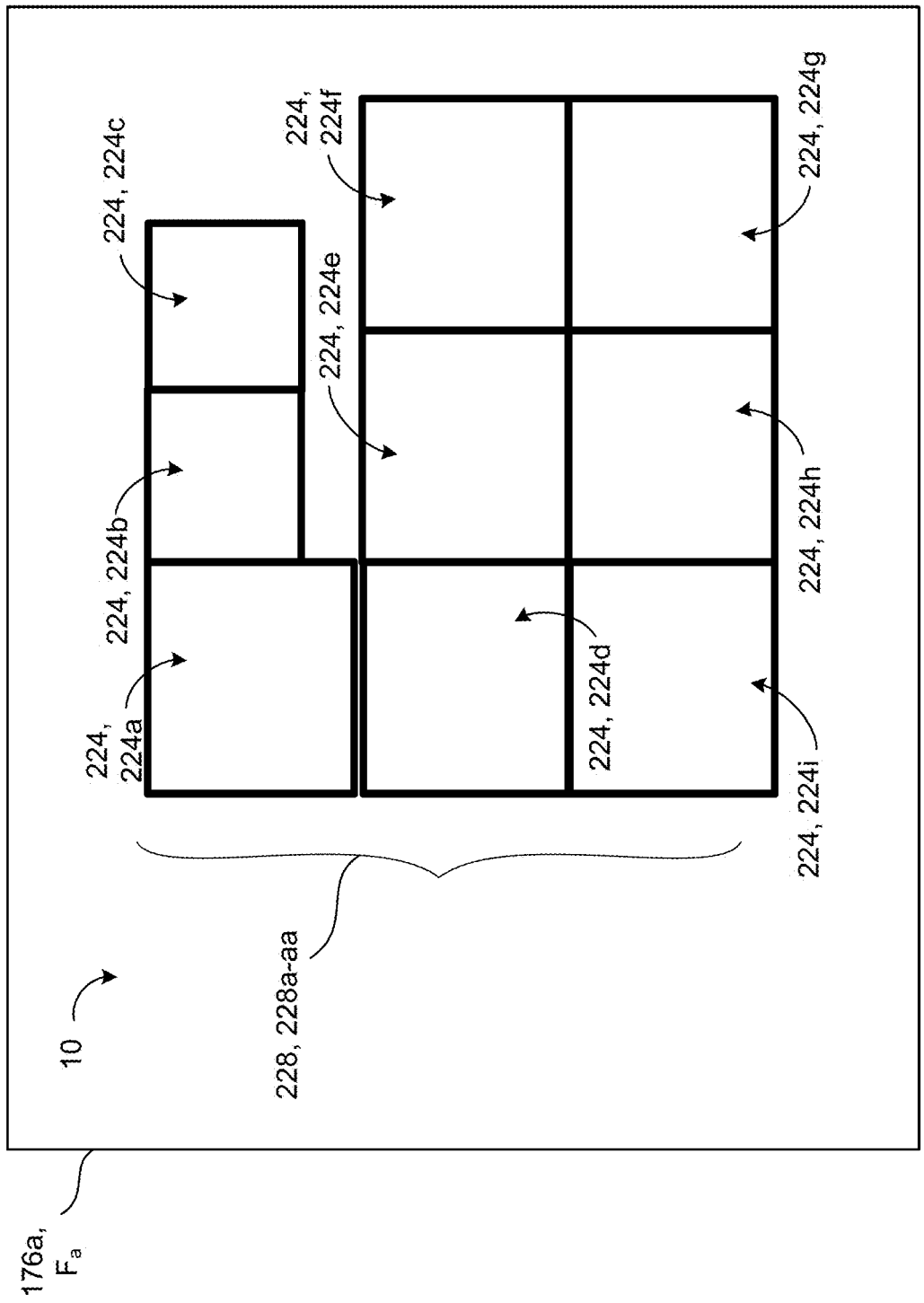

In the first stage, the estimator 220 is configured to match similar geometry of the at least one target box 202 within the monocular image 176a to the depth image 176b. In some examples, based on the corners 214, the estimator 220 matches faces of the at least one target box 202 within the monocular image 176a to planes of the at least one target box 202 within the depth image 176b. In other words, the estimator 220 matches a two-dimension feature of a target box 202 (i.e., a face 214) to a similar three-dimension feature of the target box 202 (i.e., a plane 216), where in each dimension, these features are based on the corners 214 determined by the modeler 210. In some implementations, the estimator 220 is configured to identify an estimated face 224 of a target box 202 based on the corners 214 for a target box 202. The estimated face 224 refers to an estimated representation of an actual face 26 of a box 20 in the work environment 10 that the estimator 220 estimates as a face from the monocular image 176a (e.g., from image data 174). The estimator 220 may identify the estimated face 224 by bounding four corners 214 for a target box 202 to form a rectangle or square representing an estimated face 224 for the target box 202. FIG. 2D depicts an example of the monocular image frame 176a, $F_a$ with nine estimated faces 224, 224a-i.

Figure 2E:
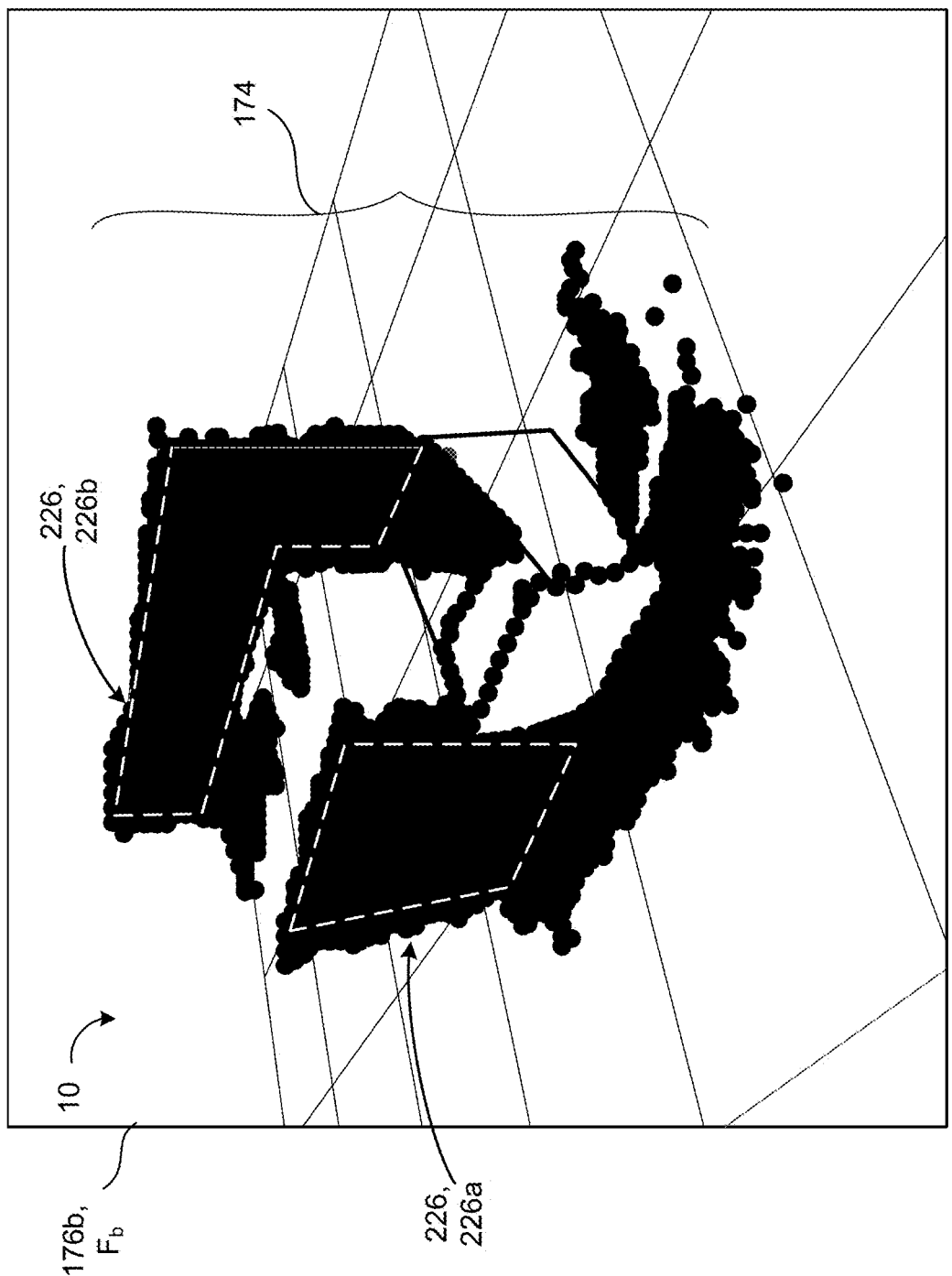

The estimator 220 may perform a similar process with the depth image frame 176b, $F_b$. Here, the estimator 220 constructs a plane 226 from image data 174 of the depth image 176b by bounding the same four corners 214 for the target box 202. The estimator 220 may extract the plane 226 by extracting depth image data 174 (e.g., a cluster of points)

within the boundary. In some examples, the estimator 220 determines a detected face 224$_D$ from image data 174 that matches between the estimated face 224 of the at least one target box 202 within the monocular image 176*a* and the plane 226 of the at least one target box 202 within the depth image 176*b*. FIG. 2E is an example of a depth image 176*b* with image data 174. In FIG. 2E, the estimator 220 has determined two planes 226, 226*a-b* from the depth image 176*b* based on the corners 214 from the modeler 210. These planes 226*a-b* are shown as dotted white lines near the edges of the point cloud forming the image data 174 for the depth image 176*b*.

In the second stage, the estimator 220 is configured to perform edge detection on the at least one target box 202 within the monocular image frame 176*a*, $F_a$. To perform edge detection, the estimator 220 may use traditional edge detection algorithms based on the corners 214 from the modeler 210. Edge detection algorithms are configured to detect changes in an image 176 (e.g., significant changes in an image intensity). Some examples of edge detection algorithms are Canny edge detection, Sobel edge detection, Prewitt edge detection, Laplacian edge detection, Roberts edge detection, Kirsch edge detection, Robinson edge detection, Marr-Hildreth edge detection, etc. As a result of the edge detection process by the estimator 220, the estimator 220 identifies detected edges 228 for the target box 202. For instance, FIG. 2D also depicts detected edges 228, 228*a*—aa forming the boundaries of the estimated faces 224.

In some examples, the estimator 220 is configured to generate a box estimation 222 for the image processing system 200 to define the geometry of the target box 202. In these examples, the estimator 220 generates the box estimation 222 for a target box 202 based on the corners 214, the detected faces 224$_D$, and the detected edges 228. As an example, based on the respective monocular image 176*a* and the respective depth image 176*b* for a corresponding image frame pair $F_{ab}$, FIG. 2F shows the estimator 220 generating a third box estimate 222, 222*c* that is setback towards a background of the image frame pair 176, 176*a-b*, $F_{ab}$ such that a box 20 is missing at a first row and a first column of the stack of boxes 20 on the pallet 30 (i.e., a missing box in the top right of the box stack). The estimator 220 is able to make this determination for the third box estimation 222, 222*c* in FIG. 2F even the monocular image frame 176*a*, $F_a$ of FIGS. 2C and 2D indicates that a box 20 may be present at a first row and a first column of the stack of boxes 20 (i.e., the estimator 220 determines a face 224, 224*c* and edges 228 for a target box 202 in the upper right corner of the stack of boxes 20). In some configurations, the estimator 220 generates the box estimation 222 using a gradient ascent optimizer. Here, the gradient ascent optimizer may receive the corners 214 determined by the modeler 210 as an initial seed (i.e., input) to generate the box estimation 222. In these configurations, the gradient ascent optimizer fits the depth image 176*b* to the respective monocular image 176*a* using the corners 214 determined from the respective monocular image 176*a*. During optimization, the gradient ascent optimizer may determine the detected edges 224 and the detected faces 224$_D$ to generate a box estimation 222 for each image frame pair $F_{ab}$.

In some implementations, a sensor 172 that captures the images 176 captures images 176 at a frame rate (i.e., frames per second (fps)) where multiple frames F are captured in a short period of time such that each frame F denotes a respective time stamp. Since the sensor 172 captures multiple frames F in a short period of time (e.g., a frame rate of 15 fps, 30 fps, or 60 fps), these frames F from a similar period of time may have minimal variation (i.e., insignificant variation for the purposes of box detection) between frames F. The estimator 220 may utilize these frame similarities obtained from the additional image data to refine/adjust the box estimation 222 over the period of time. More specifically, the estimator 220 determines an adjusted box estimation 222 for each target box 202 by aggregating the box estimations 222, 222A-N generated for each image frame pair $F_{ab}$. Here, each image frame pair $F_{ab}$ is associated with its respective time stamp corresponding to a respective one of the multiple frames F, $F_{1-n}$. For instance, the estimator 220 generates a first box estimation 222, 222A for a target box 202 for a first image frame pair $F_{ab1}$ associated with the respective time stamp and a second box estimation 222, 222B for a second image frame pair $F_{ab2}$ associated with the respective time stamp. Here, frames F of the first image frame pair $F_{ab2}$ and frames F of the second image frame pair $F_{ab2}$ may be adjacent frames (i.e., neighboring frames) or relatively adjacent frames with minimal subject matter variation. A location of the first box estimation 222*a* within the first image frame pair $F_{ab1}$ and a location of the second box estimation 222*b* within the second image frame pair $F_{ab2}$ correspond to similar locations within each frame F. In these examples, the estimator 220 compares these estimations 222*a-b* from the frames F and is configured to adjust its box estimation 222 over the period of time based on the comparison. For instance, the adjustment may be based on statistical analysis between box estimations 222 (e.g., a mean, a median, a mode, etc.). Although this example compares two frame pairs $F_{ab1,2}$, the estimator 220 is configured to refine/determine its adjusted box estimation 222 based on aggregating any number of box estimations 222.

By using a monocular image 176*a* and a depth image 176*b*, the image processing system 200 may avoid issues with other machine vision techniques. For example, a machine vision technique using only a monocular image 176*a* suffers from inaccuracies such as a depth for a box 20 or an orientation of a box 20. In other words, for stack of boxes 20 (e.g., on a pallet 30), a technique using only monocular images 176*a* may not accurately identify boxes 20 set back or removed from the stack of boxes 20. As an example, a machine vision technique using only a monocular image 176*a* would have difficulty accurately detecting the box 20 in the top right corner of the stack of boxes 20 in FIG. 2A. Occlusions or partial occlusions of a monocular image 176*a* are often problematic for these machine vision techniques. In other words, the third box estimation 222, 222*c* of FIG. 2F would likely be inaccurate.

The image processing system 200 may also more efficiently generate a box estimate 222 compared to other image processing techniques. For instance, the image processing system 200 is configured to be conscientious about processing time for generating the box estimate 222. By strategically detecting some geometric feature(s) from a monocular image 176*a* and some feature(s) from a depth image 176*b*, the image processing system 200 may reduce processing times. More particularly, the image processing system 200 utilizes the monocular image 176*a* for several processing steps to generate geometric features of the target box 202 (e.g., determining corners 214, detecting edges 228, estimating faces 224, etc.) because the monocular image 176*a* may include less image data 174 than an associated depth image 176*b*. With less image data 174, the image processing system 200 may make efficient use of the monocular image 176*a* while still utilizing image data 174 from the depth image 176*b* to ensure box detection accuracy. Accordingly, this hybrid image approach, by comparison to other techniques (e.g., only using a single type of image 176 or determining all geometric features for each image 176), may reduce processing time while providing accuracy.

Referring back to FIG. 1B, in some implementations, the control system 140 of the robot 100 includes a vision system 146. The vision system 146 is configured to provide guidance for the robot 100 and/or an operator of the robot 100. Here, the guidance may enable the robot 100 to perform tasks in the work environment 10 relating to boxes 20 that the image processing system 200 identifies with box estimation 222. For instance, the vision system 146 generates a visual representation (i.e., a projection) of the box estimation 222. In some examples, the visual representation may allow image registration (e.g., automatic recognition) between a box 20 within the vision (i.e., within a field of view for a sensor 172) of the robot 100 and a box estimation 222 corresponding to the box 20. In some configurations, the vision system 146 displays the box estimation 222 as a homographic projection for the robot 100. For example, FIG. 3 shows the homographic projection as an outline of a box 20 (e.g., a solid outline for the first box estimation 222a or a segmented cross outline for the second box estimation 222b).

Additionally or alternatively, the visual representation may be color-coded to indicate a confidence interval or confidence level for the box estimation 222 of the image processing system 200. The confidence interval refers to a probability (i.e., likelihood) that the box estimation 222 is accurate (e.g., as to a location and/or a geometry of an actual box 20 within the work environment 10). As the robot 100 moves about the work environment 10, the vision system 146 may change a color of the visual representation for the box estimation 222. In other words, in real-time the robot 100, at the vision processing system 200, may receive image data 174 that updates or modifies the box estimation 222 causing the vision system 146 to change the confidence level associated with the box estimation 222 and thus the color. In some examples, the robot 100 or operator of the robot 100 performs tasks relating to a box 20 (e.g., manipulating the box 20 or processing the box 20) when the confidence level for the box estimation 222 of the box 20 reaches a threshold. As an example, the vision system 146 represents the box estimation 222 in three colors, red, yellow, and green. Here, the red, yellow, and green colors rank in increasing order of confidence for the box estimation 222: the red color indicates that there is a box estimation 222 for a given box 20, but a low confidence for the box estimation 222; the yellow color indicates a medium confidence for the box estimation 222; and the green color indicates a highest level of confidence for the box estimation 222. As just an example, the number of colors may vary such that the confidence level may include more or less than three colors.

Figure 3:
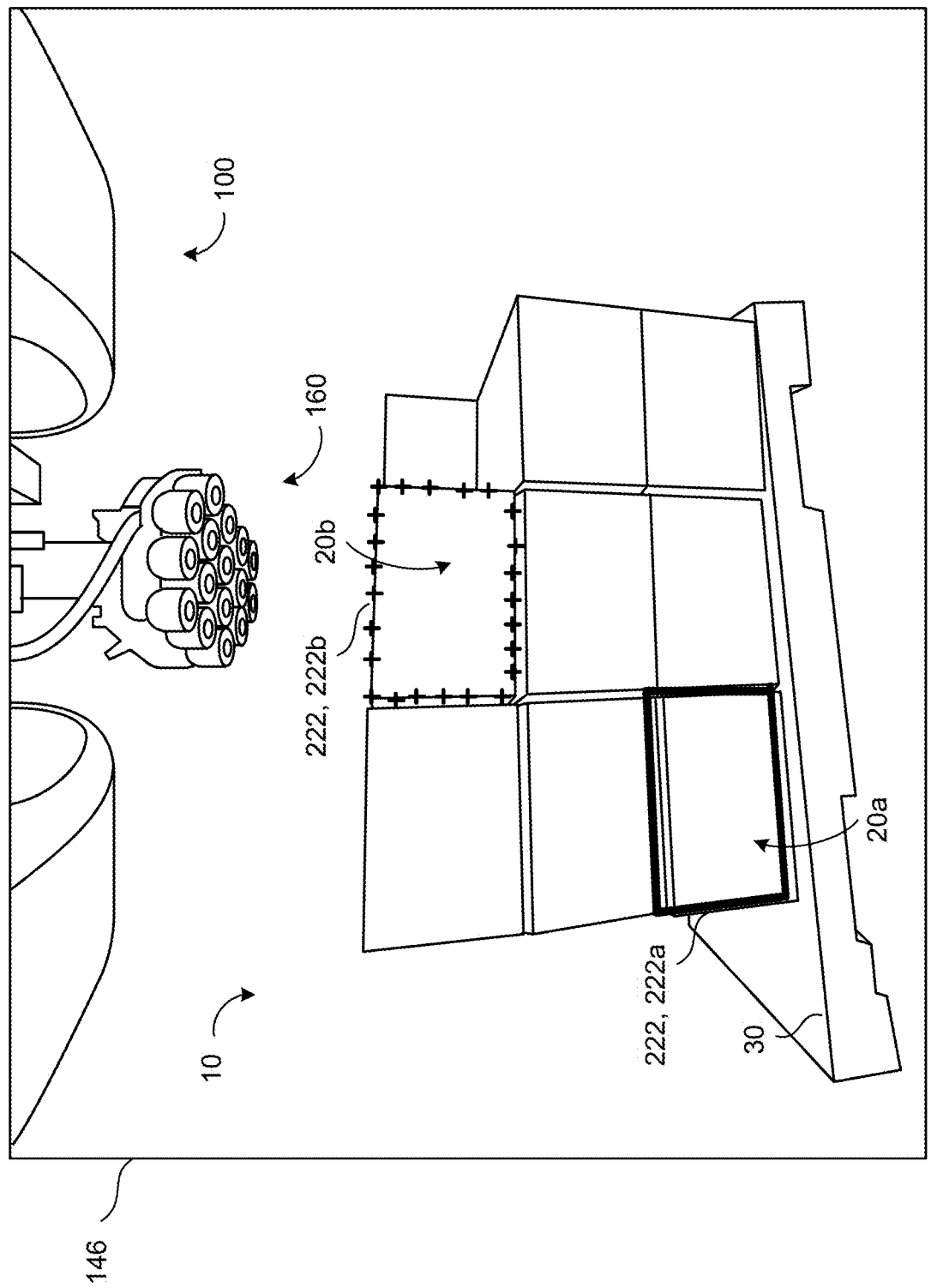
FIG. 3 is a perspective view of an example vision system for the robot of FIG. 1A using the image processing system of FIG. 2A.

To illustrate the confidence interval and/or projection for a target box 202, FIG. 3 depicts a non-color example of the vision system 146 (e.g., a display of the vision system 146). Here, a box 20 detected by the image processing system 200 has either a bolded solid outline (e.g., the first estimated box 222a) or segmented cross outline (e.g., the second estimated box 222b). The bolded solid outline visually represents a first box 20a with a first box estimation 222a that has a low confidence level while the segmented cross outline visually represents a second box 20b with a second box estimation 222b that has a high confidence level.

Figure 4:
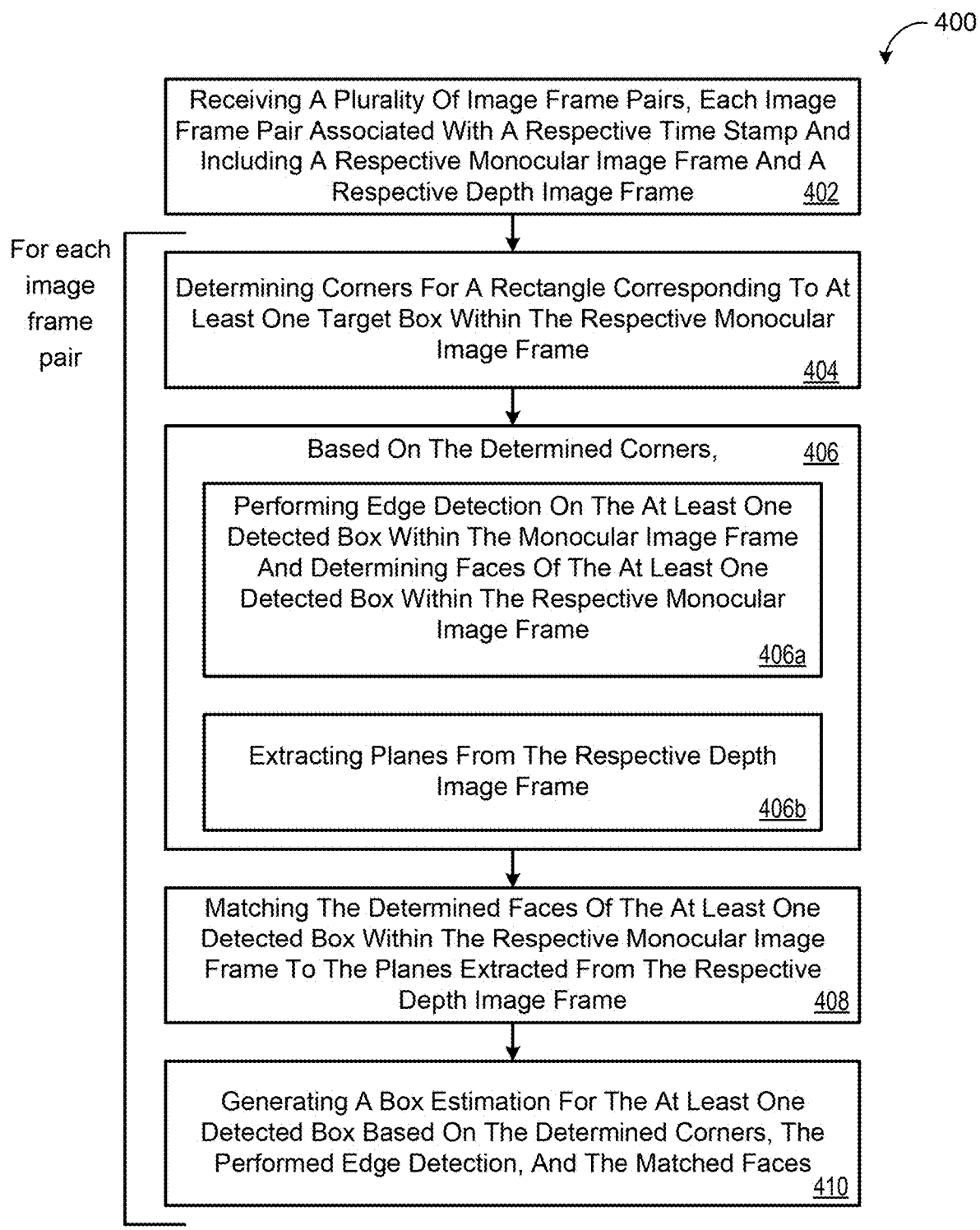
FIG. 4 is an example arrangement of operations for a robot to detect a box within a work environment.

FIG. 4 is a method 400 for detecting boxes. At operation 402, the method 400 receives a plurality of image frame pairs $F_{ab1-n}$ for an area of interest over a period of time where the area of interest including the at least one target box 202. Here, each image frame pair $F_{ab}$ of the plurality of image frame pairs $F_{ab1-n}$ is associated with a respective time stamp during the period of time and includes a monocular image frame 176a, $F_a$ and a respective depth image frame 176b, $F_b$. The method 400 performs operations 404-410 for each image frame pair $F_{ab}$. At operation 404, the method 400 determines corners 214 for a rectangle associated with the at least one target box 202 within the monocular image frame 176a, $F_a$. Based on the determined corners 214, the method 400 performs operations 406, 406a-b. At operation 406a, the method 400 performs edge detection on the at least one target box 202 within the respective monocular image frame 176a, $F_a$ and determines faces 224 of the at least one target box 202 within the respective monocular image frame 176a, $F_a$. At operation 406b, the method 400 extracts planes 226 from the respective depth image frame 176b, $F_b$ where the planes 226 extracted from the respective depth image frame 176b, $F_b$ correspond to the at least one target box 202. At operation 410, the method 400 matches the determined faces 224 of the at least one target box 202 within the monocular image frame 176a, $F_a$ to planes 226 extracted from the depth image 176b, $F_b$. At operation 410, the method 400 generates a box estimation 222 based on the determined corners 214, the performed edge detection 228, and the matched faces $224_D$ of the at least one target box 202.

Optionally, the method 400 further operations. For instance, the method 400 aggregates the box estimation 222 generated for each image frame pair $F_{ab}$ to determine an adjusted box estimation 222 over the period of time for the at least one target box 202. Aggregating the box estimation 222 generated for each image frame pair $F_{ab}$ may include comparing a first box estimation 222a of the at least one target box 202 generated for a first image frame pair $F_{ab1}$ to a second box estimation 222b of the at least one target box 202 generated for a second image frame pair $F_{ab2}$ and adjusting the box estimation 222 over the period of time based on the comparison between the first box estimation 222a and the second box estimation 222b.

Figure 5:
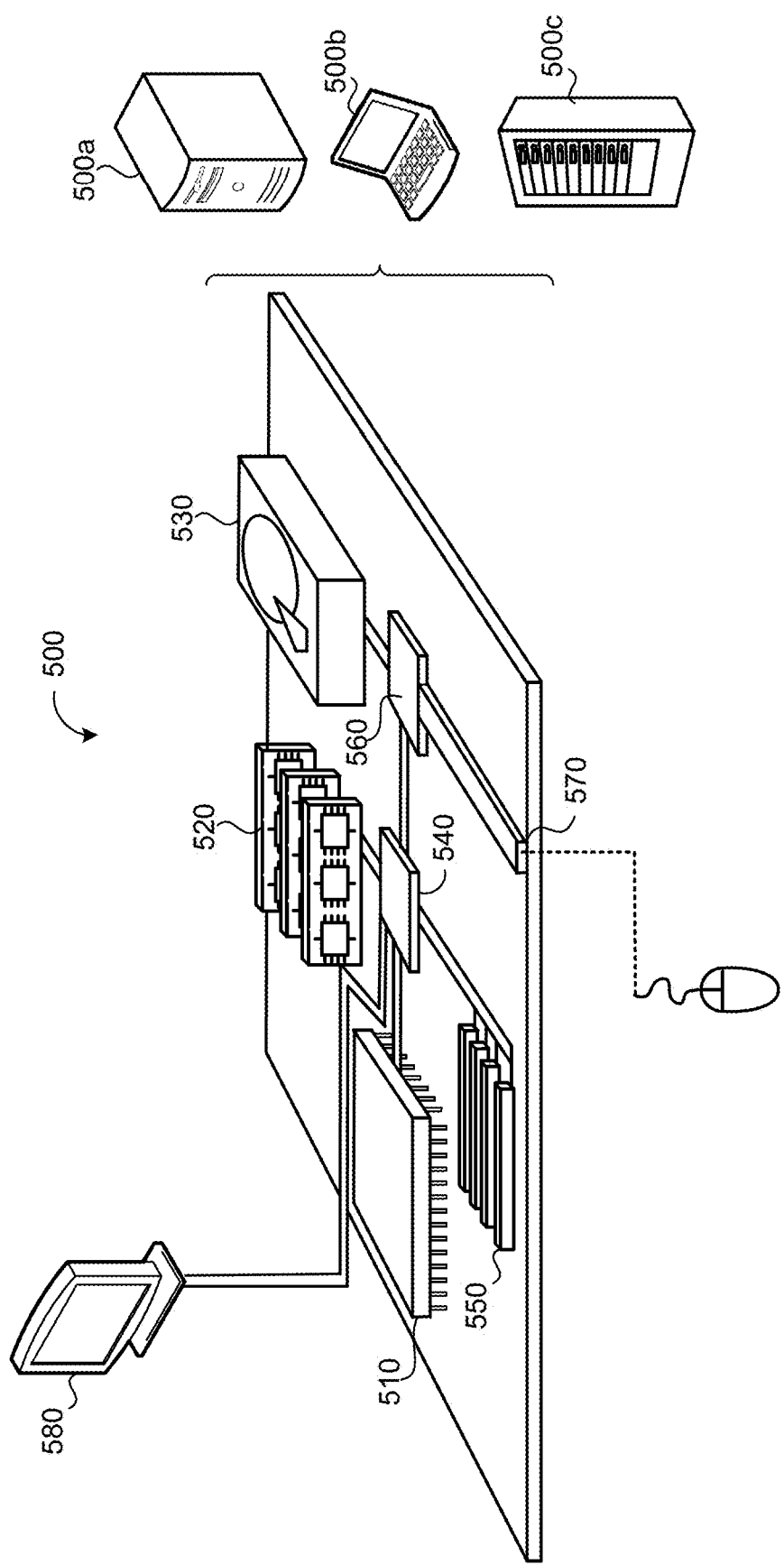
FIG. 5 is a schematic view of an example computing device that may be used to implement the systems and methods described herein.

FIG. 5 is schematic view of an example computing device 500 that may be used to implement the systems (e.g., the control system 140, the sensor system 170, the vision system 146, the image processing system 200, etc.) and methods (e.g., method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
an arm comprising an end effector;
a mobile base, wherein the mobile base and the arm are independently moveable;
a plurality of sensors comprising a first sensor and a second sensor; and
a computing system in communication with the plurality of sensors, wherein the computing system is configured to:
obtain, from the first sensor, first sensor data reflecting a package, wherein the first sensor data comprises two-dimensional sensor data;
obtain, from the second sensor, second sensor data reflecting the package,
wherein the second sensor data comprises three-dimensional sensor data;
detect the package using the first sensor data and the second sensor data by:
identifying, using the first sensor data, one or more two-dimensional coordinate locations of one or more corners of the package; and
determining, using the first sensor data and/or the second sensor data,
a face corresponding to the package based on the one or more two-dimensional coordinate locations of the one or more corners of the package; and
instruct the end effector to interact with the face of the package based on detecting the package.

2. The robot of claim 1, wherein the two-dimensional sensor data comprises a monocular image and the three-dimensional sensor data comprises a depth image.

3. The robot of claim 1, wherein the two-dimensional sensor data and the three-dimensional sensor data are associated with a same time stamp.

4. The robot of claim 1, wherein to detect the package, the computing system is further configured to detect a location of the package using the first sensor data and the second sensor data.

5. The robot of claim 1, wherein one or more of the first sensor or the second sensor are mounted on the arm.

6. The robot of claim 1, wherein the computing system is further configured to:
determine the face corresponding to the package from the first sensor data; and
determine a plane corresponding to the package from the second sensor data.

7. The robot of claim 1, wherein, to detect the package, the computing system is further configured to:
determine the face corresponding to the package from the first sensor data;
match the face to a plane determined from the second sensor data;
generate an estimation for the package using the face and the plane; and
derive a location of the package from the estimation.

8. The robot of claim 1, wherein, to detect the package, the computing system is further configured to:
match the face corresponding to the package to a plane determined from the second sensor data;
generate an estimation for the package using the face and the plane; and
derive a location of the package from the estimation.

9. The robot of claim 1, wherein the computing system comprises a machine learning model.

10. The robot of claim 1, wherein the computing system comprises a machine learning model configured to receive a respective pair of images as input and to predict a location of the package as output.

11. The robot of claim 1, further comprising a body of the robot.

12. The robot of claim 1, wherein the package comprises a box.

13. The robot of claim 1, wherein arm comprises an articulated arm.

14. The robot of claim 1, wherein the computing system comprises an image processing system.

15. The robot of claim 1, wherein the end effector comprises a plurality of suction cups to interact with the package.

16. The robot of claim 1, wherein the robot further comprises at least one wheel.

17. The robot of claim 1, wherein the robot further comprises at least one wheel, wherein the computing system is further configured to drive the robot across a surface to deliver the package to a destination.

18. A computer-implemented method comprising:
obtaining, by data processing hardware, from a first sensor of a plurality of sensors of a robot, first sensor data reflecting a package, wherein the first sensor data comprises two-dimensional sensor data, the robot comprising an arm, a mobile base, and the plurality of sensors, the arm comprising an end effector, the plurality of sensors comprising the first sensor and a second sensor, wherein the mobile base and the arm are independently moveable;
obtaining, by the data processing hardware, from the second sensor, second sensor data reflecting the package, wherein the second sensor data comprises three-dimensional sensor data;
detecting, by the data processing hardware, the package using the first sensor data and the second sensor data by:
identifying, using the first sensor data, one or more two-dimensional coordinate locations of one or more corners of the package; and
determining, using the first sensor data and/or the second sensor data, a face corresponding to the package based on the one or more two-dimensional coordinate locations of the one or more corners of the package; and
instructing, by the data processing hardware, the end effector to interact with the face corresponding to the package based on detecting the package.

19. The computer-implemented method of claim 18, wherein detecting the package comprises:
determining the face corresponding to the package from the first sensor data;
matching the face to a plane determined from the second sensor data;
generating an estimation for the package using the face and the plane; and
deriving a location of the package from the estimation.

* * * * *